(12) United States Patent
Adams, III et al.

(10) Patent No.: US 7,377,343 B2
(45) Date of Patent: May 27, 2008

(54) CENTRIFUGAL CLUTCH

(75) Inventors: Herbert L. Adams, III, Waterford, MI (US); Gregory A. Marsh, Ferndale, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 102 days.

(21) Appl. No.: 11/415,482

(22) Filed: May 1, 2006

(65) Prior Publication Data

US 2007/0251743 A1 Nov. 1, 2007

(51) Int. Cl.
*B60K 6/38* (2007.10)
*B60K 6/20* (2007.10)
*F16D 43/18* (2006.01)

(52) U.S. Cl. ............... 180/65.2; 180/65.6; 192/104 C

(58) Field of Classification Search ............ 192/104 C
See application file for complete search history.

(56) References Cited

U.S. PATENT DOCUMENTS

| | | | |
|---|---|---|---|
| 1,927,509 A | | 9/1933 | Waterhouse |
| 2,213,524 A | * | 9/1940 | Kucznierz ............... 192/104 C |
| 2,514,228 A | | 7/1950 | Dodge |
| 2,746,585 A | | 5/1956 | Binder |
| 2,863,545 A | * | 12/1958 | Spase ..................... 192/104 C |
| 3,804,222 A | | 4/1974 | Reams |
| 4,026,240 A | | 5/1977 | DeFevere et al. |
| 4,042,056 A | | 8/1977 | Horwinski |
| 4,046,240 A | | 9/1977 | Schlagmuller et al. |
| 4,533,011 A | | 8/1985 | Heidemeyer et al. |
| 4,673,073 A | | 6/1987 | Weatherby |
| 4,687,085 A | | 8/1987 | Shimizu et al. |
| 5,165,510 A | | 11/1992 | Lunati |
| 5,419,406 A | | 5/1995 | Kawamoto et al. |
| 5,428,274 A | | 6/1995 | Furutani et al. |
| 5,503,261 A | | 4/1996 | Schultz |
| 5,635,805 A | | 6/1997 | Ibaraki et al. |
| 5,722,502 A | | 3/1998 | Kubo |
| 5,733,217 A | | 3/1998 | Naraki et al. |
| 5,786,640 A | | 7/1998 | Sakai et al. |
| 6,008,606 A | | 12/1999 | Arai et al. |
| 6,024,182 A | | 2/2000 | Hamada et al. |
| 6,326,702 B1 | | 12/2001 | Yonekura et al. |
| 6,333,620 B1 | | 12/2001 | Schmitz et al. |
| 6,524,215 B1 | | 2/2003 | Schmidt |
| 6,691,809 B2 | | 2/2004 | Hata et al. |
| 6,817,432 B2 | | 11/2004 | Kitada et al. |
| 6,832,972 B2 | * | 12/2004 | Ishikawa ................ 475/223 |
| 6,846,257 B2 | | 1/2005 | Baker et al. |

(Continued)

*Primary Examiner*—Rodney H Bonck
(74) *Attorney, Agent, or Firm*—Harness, Dickey & Pierce, P.L.C.

(57) ABSTRACT

A wheel drive assembly that can include a motor having an output shaft, a wheel mount that is adapted to have a wheel mounted thereto, a wheel shaft with a first end drivingly coupled to the wheel mount, and a clutch. The clutch can have a first body, a second body, and a plurality of sliders. The first body of the clutch can be coupled for rotation with the wheel shaft, and the second body of the clutch can be coupled for rotation with the output shaft of the motor. The sliders of the clutch can be movably mounted to the first body and biased into engagement with the second body. At a rotational speed above a predetermined speed, the sliders can move radially outwardly and disengage the second body.

7 Claims, 2 Drawing Sheets

U.S. PATENT DOCUMENTS

| | | |
|---|---|---|
| 7,017,542 B2 | 3/2006 | Wilton et al. |
| 7,028,583 B2 | 4/2006 | Bennett |
| 7,108,087 B2 | 9/2006 | Imai |
| 2003/0183477 A1 | 10/2003 | Chevalier |
| 2005/0161948 A1 | 7/2005 | Yang |
| 2005/0224264 A1 | 10/2005 | Perrin |
| 2006/0201725 A1 | 9/2006 | Kano et al. |
| 2006/0225930 A1 | 10/2006 | Schulte |

* cited by examiner

CENTRIFUGAL CLUTCH

INTRODUCTION

The present disclosure generally relates to couplings for motor vehicles and more particularly to an auxiliary drive system for a motor vehicle that employs a centrifugal clutch.

A motor vehicle having a hybrid power train is disclosed in co-pending and commonly assigned U.S. patent application Ser. No. 11/415,457, filed on even date herewith and entitled "Vehicle with Hybrid Power Train Providing Part-Time All-Wheel Drive", the disclosure of which is hereby incorporated by reference as if fully set forth in its entirety herein. Such vehicles can include a main drive system, which can serve as the primary source of power for propelling the vehicle through a first set of wheels (e.g., the front wheels), and an auxiliary drive system, which can be selectively operated to provide additional power to a second set of wheels (e.g., the rear wheels).

It can be desirable to decouple an auxiliary drive system from the second set of wheels in some situations, such as when the vehicle is operated at relatively high speeds. As will be appreciated, permanent coupling of the auxiliary drive system with the second set of wheels would permit the second set of wheels to back-drive the electric motor of the auxiliary drive system and thereby produce losses that would reduce the efficiency of the hybrid power train.

Accordingly, there remains a need in the art for an auxiliary drive system that is configured to automatically disengage from a set of wheels when the wheels are rotated above a predetermined rotational speed.

SUMMARY

In one form, the present disclosure provides a wheel drive assembly. The wheel drive assembly can include a motor having an output shaft, a wheel mount that is adapted to have a wheel mounted thereto, a wheel shaft with a first end drivingly coupled to the wheel mount, and a clutch. The clutch can have a first body, a second body, and a plurality of sliders. The first body of the clutch can be coupled for rotation with the wheel shaft, and the second body of the clutch can be coupled for rotation with the output shaft of the motor. The sliders of the clutch can be movably mounted to the first body and biased into engagement with the second body. At a rotational speed above a predetermined speed, the sliders can move radially outwardly and disengage the second body.

In another form, the present disclosure provides a method of selectively coupling a motor and a wheel assembly. The method can include: positioning a motor having an output shaft proximate a wheel assembly having a wheel shaft; connecting a clutch having a plurality of clutch members between the output shaft and the wheel shaft; biasing the clutch members radially inwardly to drivingly connect the output shaft and the wheel shaft; and rotating the wheel shaft to a speed that exceeds a predetermined rotational speed to cause the clutch members to move radially outwardly and decouple the output shaft and the wheel shaft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present disclosure will become more fully understood from the detailed description and the accompanying drawings, wherein.

DETAILED DESCRIPTION OF THE VARIOUS EMBODIMENTS

Figure 1:
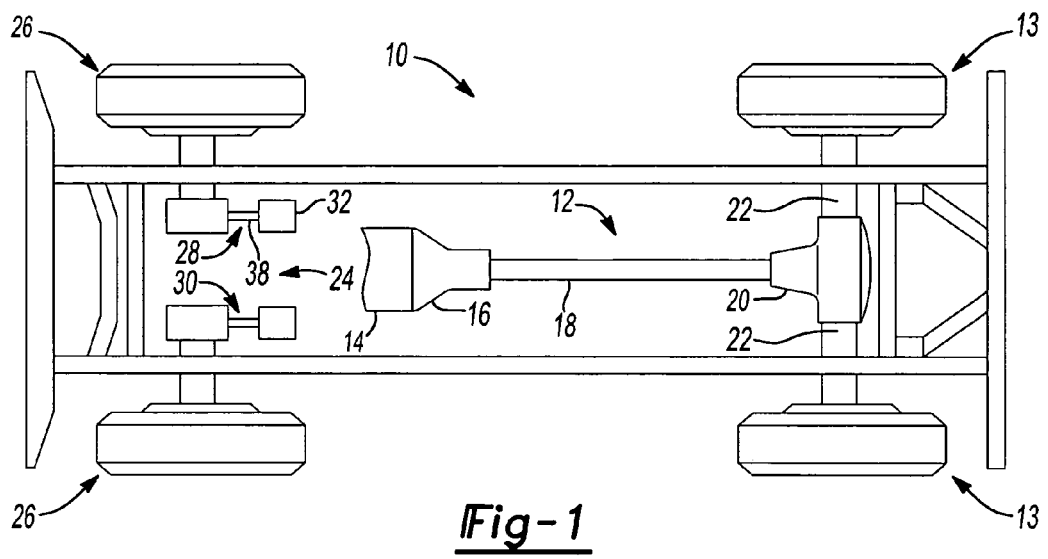
FIG. 1 is a schematic illustration of an exemplary motor vehicle having a wheel drive assembly constructed in accordance with the teachings of the present disclosure.

With reference to FIG. 1 of the drawings, a vehicle having a wheel drive assembly that is constructed in accordance with the teachings of the present disclosure is generally indicated by reference numeral 10. The vehicle 10 can include a main drive system 12, and a set of rear wheels 13. The main drive system 12 can be conventionally configured and can include a first motor 14, a transmission 16, a drive shaft 18, and a differential assembly 20. The first motor 14 can be operable for providing a primary source of propulsive power for propelling the vehicle 10. In the particular example provided, propulsive power generated by the first motor 14 can be transmitted through the transmission 16, the differential assembly 20 and a pair of half shafts 22 to the set of rear wheels 13 in a manner that is well known in the art.

Vehicle 10 can also include an auxiliary drive system indicated generally at 24. Auxiliary drive system 24 can be employed to selectively provide drive torque to a set of front wheels 26 and can include a pair of drive units 28 and 30. Each of the drive units 28 and 30 can be configured identically and as such, only drive unit 28 will be discussed in detail herein.

Figure 2:
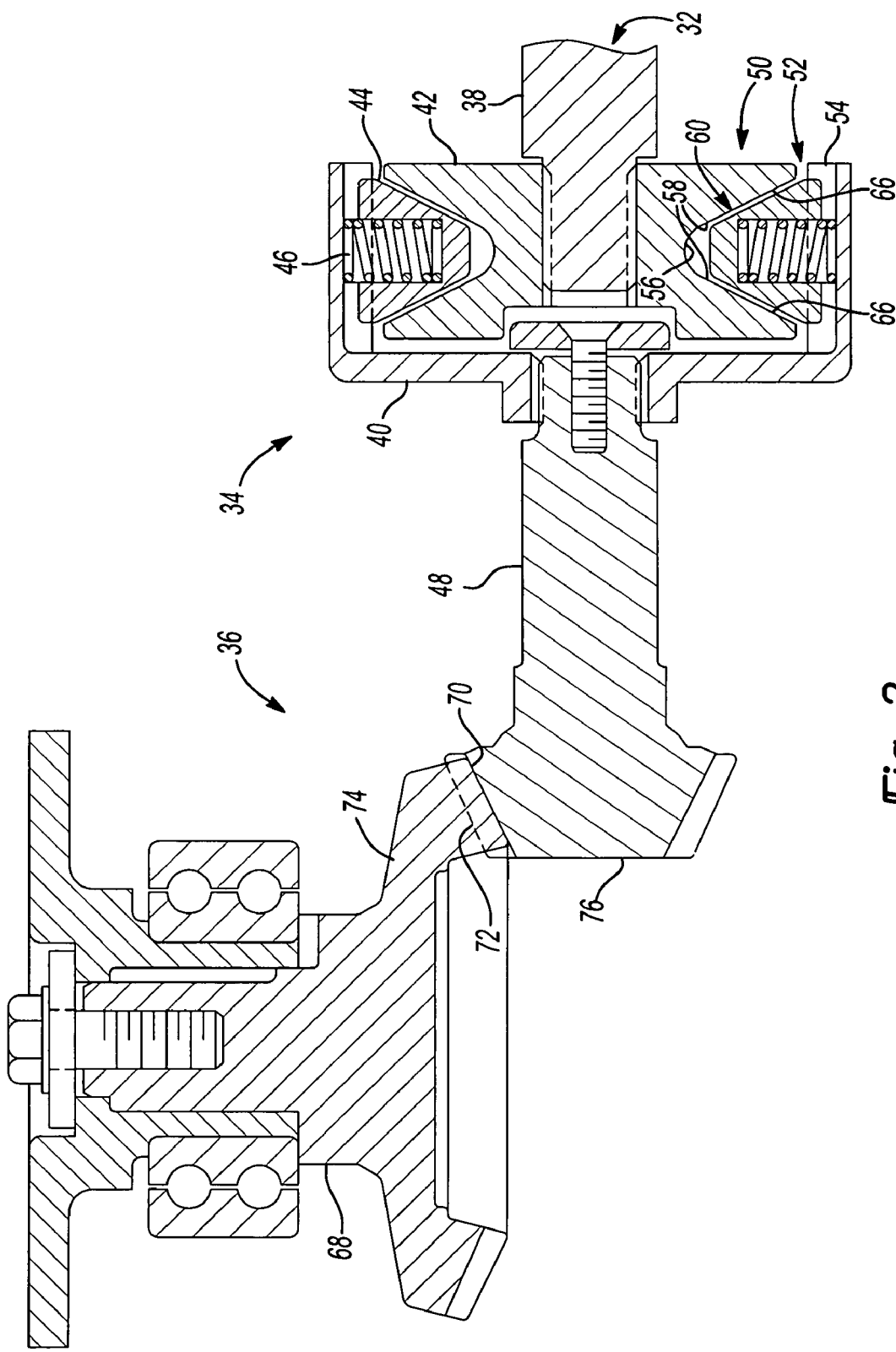
FIG. 2 is a longitudinal section view of the wheel drive assembly of FIG. 1.

With reference to FIG. 2, drive unit 28 can include a second motor 32, a clutch 34, and a gear reduction 36. The second motor 32 can be any type of motor, such as a brushed or brushless DC electric motor, and can be coupled to a source of electricity in a manner described in copending U.S. patent application entitled "Vehicle with Hybrid Power Train Providing Part-Time All-Wheel Drive". The second motor 32 can include an output shaft 38 that can provide rotatary power to the clutch 34.

Figure 3:
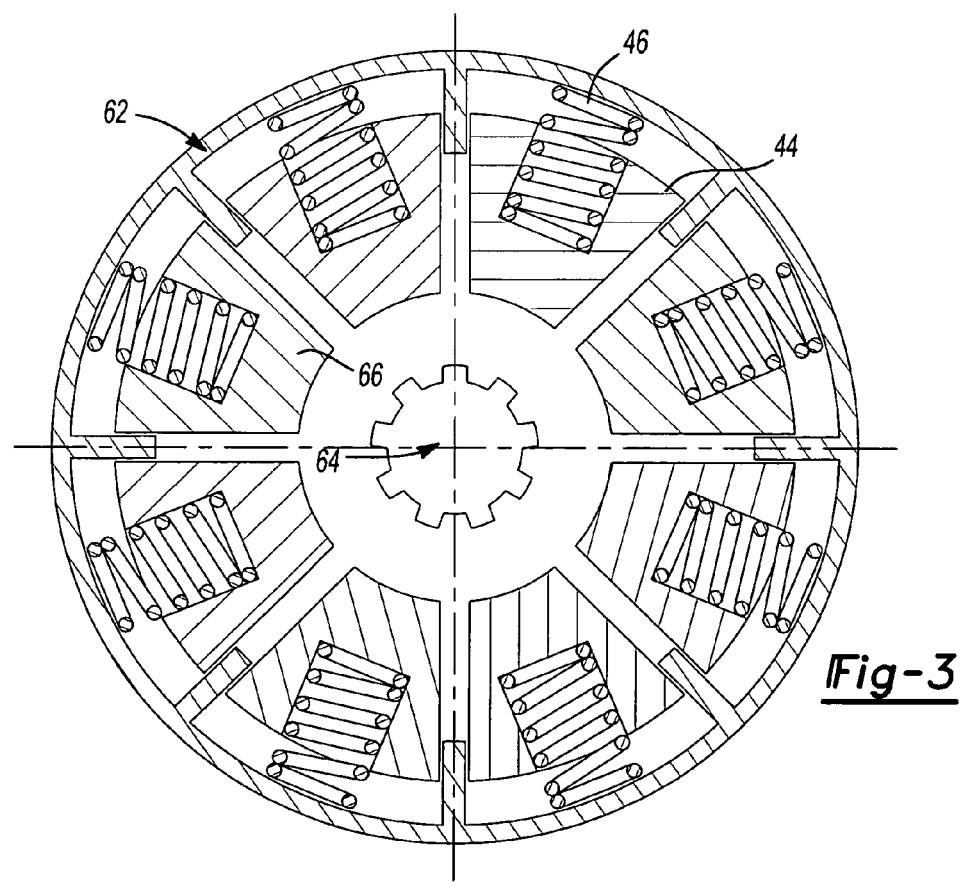
FIG. 3 is a sectional view of a portion of the wheel drive assembly of FIG. 1 illustrating the clutch in more detail.

With reference to FIGS. 2 and 3, the clutch 34 can include a first body 40, a second body 42, a plurality of sliders 44, and a plurality of biasing members 46. The first body 40 can be fixedly coupled to an input member 48 of the gear reduction 36, while the second body 42 can be fixedly coupled to the output shaft 38 of the second motor 32. The sliders 44 can be coupled to the first body 40 in a non-rotational but radially movable manner. In the particular example provided, the first body 40 includes an internal chamber 50 having a plurality of cavities 52, which are configured to receive a respective one of the sliders 44, and a plurality of radially inwardly extending wall members 54 that are disposed between adjacent cavities 52. The radially inwardly extending wall members 54 permit radial movement and inhibit circumferential movement of the sliders 44. Biasing members 46 can be disposed between the first body 40 and an associated one of the sliders 44.

The second body 42 can define a circumferential groove 56 having opposite sloped side walls 58 that collectively form a sloped portion 60. The second body 42 can be unitarily formed of any suitable material, such as an appropriate carbon steel. Alternatively, the second body 42 can have a composite construction, wherein the sloped portion 60 can be formed of a first material and the remainder of the second body 42 can be formed of a second material that is different from the first material.

The sliders 44 can have a circular ring sector shape 62 and can cooperate to form a disc-shaped structure with an aperture 64 formed therethrough. The sliders 44 can include mating sloped side walls 66 that can be sized to engage a corresponding one of the sloped walls 58 of the sloped portion 60 of the second body 42. The sliders 44 can be formed of steel or a suitable composite. Composite materials could be formed to include an outer layer that includes a clutch material and an inner or substrate portion that can be relatively light in weight.

The biasing members 46 can be configured to bias the sliders 44 toward the second body 42 such that the mating sloped walls 66 frictionally engage the sloped walls 58 of the sloped portion 60 to thereby couple the sliders 44 to the second body 42. The biasing members 46 can be any appropriate type of spring or resilient device, but in the particular embodiment illustrated, are helical compression springs.

The gear reduction 36 can be disposed between a wheel mount or hub 68, which is employed to mount an associated one of the wheels 26, and the clutch 34. In the particular example provided, the gear reduction 36 is a single stage reduction, but those of ordinary skill in the art will appreciate from this disclosure that multiple gear reductions may be employed between the second motor 32 and the wheel hub 68. In the particular example provided, the gear reduction 36 employs bevel gearing with a first set of gear teeth 70 and a second set of gear teeth 72. The first set of gear teeth 70 can be coupled to or integrally formed on a flange 74 of the wheel hub 68, while the second set of gear teeth 72 can be coupled to or integrally formed on an end 76 of the input member 48 that is fixedly coupled to the first body 40 of the clutch 34.

Clutch 34 is configured to couple and decouple second motor 32 and wheel hub 68. At speeds below a predetermined rotational speed of wheel hub 68, the biasing members 46 are configured to bias sliders 44 toward the second body 42 such that the mating sloped side walls 66 engage the sloped walls 58 to permit drive torque to be transmitted from the second body 42 through the sliders 44 to the first body 40. Accordingly, the output shaft 38 of the second motor 32 is drivingly coupled to the wheel hub 68 when the sliders 44 are engaged with second body 42.

When the wheel hub 68 rotates at speeds above the predetermined rotational speed, centrifugal force urges the sliders 44 radially outwardly from the second body 42 such that the mating sloped side walls 66 disengage the sloped walls 58 to thereby inhibit the transmission of rotary power between the wheel shaft (i.e., a structure, such as the input member 48, that is drivingly coupled to the wheel mount or hub 68) and the output shaft 38. In this condition, the sliders 44 are decoupled from the second body 42 and can freely rotate within the circumferential groove 56. In order to disengage clutch 34 at the predetermined rotational speed of wheel hub 68, according to the principles of the present disclosure, sliders 44 are configured to have enough centrifugal force at the predetermined rotational speed of wheel hub 68 to overcome the force of biasing members 60. Depending on the gear reduction 36 and the values of the predetermined rotational speed of wheel hub 68 and the force of biasing members 46, the size and material of sliders 44 are selected to give each of sliders 44 a mass that produces the required centrifugal force at the predetermined rotational speed of wheel hub 68. Thus, at the predetermined rotational speed of wheel hub 68, sliders 44 move radially outwardly, disengaging second body 42 and decoupling output shaft 38 and wheel hub 68.

While specific examples have been described in the specification and illustrated in the drawings, it will be understood by those of ordinary skill in the art that various changes may be made and equivalents may be substituted for elements thereof without departing from the scope of the present disclosure as defined in the claims. For example, it will be appreciated from this disclosure that the second motor 32 could be an AC induction motor and/or that the clutch 34 could be a slip clutch or could be omitted altogether. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out this invention, but that the scope of the present disclosure will include any embodiments falling within the foregoing description and the appended claims.

What is claimed is:

1. A vehicle drive train comprising:
   a first drive system that is adapted to transmit rotary power from a first power source to a first set of vehicle wheels; and
   a second drive system that is adapted to selectively transmit rotary power to a second set of vehicle wheels, the second drive system including a pair of drive units, each drive unit having a motor, a friction clutch, a first gear, a second gear and a wheel hub, the motor having a motor output shaft, the friction clutch including a first portion, which is coupled for rotation with the motor output shaft, a second portion, which is coupled for rotation with the first gear, a plurality of sliders received between the first and second portions, and a plurality of springs that bias the sliders in a radially inward direction toward one of the first and second portions, each of the sliders being received between a pair of radially extending wall members, each of the springs being received between an associated one of the sliders and the other one of the first and second portions between two of the radially extending wall members, the first gear being meshingly engaged to the second gear, the second gear driving the wheel hub;
   wherein the sliders move radially outward at a predetermined rotational speed to disengage the one of the first and second portions to rotationally decouple the motor output shaft from the wheel hub.

2. The vehicle drive train of claim 1, wherein the one of the first and second portions has a sloped portion for engaging the sliders.

3. The vehicle drivetrain of claim 2, wherein each of the sliders has a sloped surface for engaging the sloped portion of the second body.

4. The vehicle drivetrain of claim 3, wherein each of the sloped surfaces has two ports that are equally sloped in opposite directions.

5. The which drivetrain of claim 1, wherein the first and second gears are bevel gears.

6. The vehicle drivetrain of claim 1, wherein the second gear is directly coupled to the wheel hub.

7. The vehicle drivetrain of claim 6, wherein the second gear is integrally formed with a portion of the wheel hub.

* * * * *